United States Patent [19]

Lamela

[11] Patent Number: 5,400,669
[45] Date of Patent: Mar. 28, 1995

[54] SYNCHRONIZER SHIMMING KIT FOR TRANSMISSIONS AND THE LIKE

[75] Inventor: Anthony J. Lamela, Gilberts, Ill.

[73] Assignee: Case Corporation, Racine, Wis.

[21] Appl. No.: 109,000

[22] Filed: Aug. 19, 1993

[51] Int. Cl.⁶ .............................................. F16H 3/08
[52] U.S. Cl. ......................................... 74/333; 74/339
[58] Field of Search ................................... 74/333, 339

[56] References Cited

U.S. PATENT DOCUMENTS

| | | | |
|---|---|---|---|
| 4,244,242 | 1/1981 | Uno et al. | 74/467 |
| 4,261,219 | 4/1981 | Suzuki et al. | 74/467 |
| 4,305,490 | 12/1981 | Hendrickson | 192/53 E |
| 5,009,118 | 4/1991 | Raszkowski et al. | 74/331 |

OTHER PUBLICATIONS

J I Case drawing Part No. FZG24017 (two sheets). Dec. 10, 1987.

*Primary Examiner*—Dirk Wright
*Attorney, Agent, or Firm*—Rudnick & Wolfe

[57] ABSTRACT

A synchronizer shimming kit adapted for assembly and mounting about a transmission shaft having a synchronizer assembly mounted thereon in operable combination with a gear mesh. The shimming kit of the present invention includes an annular member and a shim package including a plurality of individual shims adapted to be positioned about the transmission shaft between the annular member and a gear of the gear mesh having the synchronizer assembly arranged in combination therewith. The annular member is releasably fixed to the shaft a measurable distance from the gear of the gear mesh. The shim package and annular member combine to define a cumulative distance between opposite sides thereof. The cumulative distance of the shimming kit is initially greater than the measurable distance the annular member is spaced from a side surface of the gear. A salient feature of the present invention is that individual shims of the shim package are,, removable from the package and from about the shaft thereby yielding a high degree of control over the operating clearance for the synchronizer assembly without requiring disassembly of the gear meshes and the synchronizer assembly from about the transmission shaft.

12 Claims, 4 Drawing Sheets

SYNCHRONIZER SHIMMING KIT FOR TRANSMISSIONS AND THE LIKE

FIELD OF THE INVENTION

The present invention generally relates to transmissions and the like and, more particularly, to a synchronizer shimming kit for providing a predetermined operating clearance for a synchronizer assembly used in combination with gear meshes within the transmission.

BACKGROUND OF THE INVENTION

Transmissions typically include a series of gear meshes for establishing different power paths through the transmission. To facilitate shifting from one power path to another, such transmissions are provided with synchronizer assemblies.

A conventional synchronizer assembly includes a synchronizer hub which is connected for rotation to a transmission shaft journalled within a transmission housing. A synchronizer ring is fit between the synchronizer hub and a clutch ring which engages with a gear forming part of a gear mesh. Depending upon the particular synchronizer assembly design, it is conventional to provide synchronizer and clutch rings on opposite sides of the synchronizer hub for engagement with gears forming part of first and second gear meshes. The synchronizer assembly further includes a sliding sleeve whose position is controlled by the operator as with a shifting collar. As is well known in the art, the sliding sleeve acts to couple the synchronizer hub to the clutch ring through the synchronizer ring as by a dog clutch type connection.

The clutch ring and the synchronizer ring each have generally corresponding frusto-conical interfacing surfaces therebetween. Interengagement between the frusto-conical surfaces on the rings tends to synchronize the speed of the synchronizer hub with the clutch ring thus facilitating engagement of the dog clutch connection and thereby effecting smooth engagement of the gear mesh.

The synchronizer assembly is designed to operate in an efficient and smooth manner when accurate and proper operating clearances are provided between inter-engaging parts of the synchronizer assembly. As will be appreciated by those skilled in the art, a predetermined tolerance is required between the parts of the synchronizer to allow the synchronizer assembly to operate in a neutral band or mode. There are specific tolerances between the parts depending upon the frictional material used to fabricate the synchronizer assembly. Moreover, tolerances are required between the respective gears and synchronizer hub to establish a running clearance therebetween. A proper clearance is furthermore required between the synchronizer hub and the gear such that proper lubrication is provided to the parts of the synchronizer assembly. As will be appreciated, too much lubricant can be detrimental to operation of the synchronizer assembly. Conversely, too little lubricant can likewise be detrimental to the proper operation of the synchronizer assembly.

The ability to properly set clearances for the synchronizer assembly may further be complicated by the transmission design. In some transmission designs, one end of the shaft on which the synchronizer assembly is mounted includes a gear which intermeshes with a pinion gear. Endwise positioning of the shaft is often required to provide a proper backlash setting between the gears. As will be appreciated, endwise shifting of the shaft complicates the ability to set proper clearances for the synchronizer assembly and, thus, effects performance and proper lubrication of the synchronizer assembly. Some transmissions used on off-highway equipment often include two axially aligned shafts which extend through different transmission compartments and are typically spline connected to each other at their ends. The tolerances involved with two axially aligned shafts arranged in driving relation relative to each other further complicates the ability to properly set clearances for the synchronizer assembly.

A conventional synchronizer assembly may have as many as seven different areas wherein manufacturing tolerances complicate the ability to set a proper and accurate working clearance for the synchronizer assembly. A conventional approach to solving the problem involves providing a snap-ting at opposite ends of the synchronizer assembly to control tolerance stackups. This approach, however, complicates the transmission design and can add substantial costs to the manufacturing process. The design of the gears and related parts do not always lend themselves to use of a standard or conventional synchronizer assembly. Thus, specifically sized parts need to be manufactured and snap-ting grooves need to be provided in the shafts to absorb the tolerances involved in such unique arrangements. Moreover, it is difficult to evaluate and access the tolerance stackup between the parts as the transmissions is assembled and, thus, a laborious process involving tear down and build up of the transmission is required to accomplish the accurate and proper clearances for the components of the synchronizer assembly.

Thus, there is a need and a desire for an apparatus arranged in combination with a transmission synchronizer assembly which provides accurate operating clearances for the synchronizer assembly notwithstanding the tolerance stackup of the inter-related parts and in a manner eliminating the need to tear down and reassemble the transmission to accomplish the operating clearances between the inter-related parts.

SUMMARY OF THE INVENTION

In view of the above, and in accordance with the present invention, there is provided a shimming kit arranged in combination with a synchronizer assembly provided on a transmission shaft. The synchronizer assembly embodies a conventional design and is arranged in combination with one or more gears defining parts of one or more gear meshes used to establish a series of power paths through the transmission. The shimming kit is arranged to one side of the synchronizer assembly to provide a predetermined operating clearance for the synchronizer assembly without requiring: disassembly of the gear meshes and the synchronizer assembly from about the transmission shaft.

The shimming kit of the present invention comprises an annular member fixed to the transmission shaft and a shim package comprised of a series of individual shims positioned about the transmission shaft between the annular member and a gear arranged in combination with the synchronizer assembly. In a most preferred from of the invention, the annular member includes a snap-ting which is releasably fixed to the transmission shaft a measurable distance from the gear arranged in operable combination with the synchronizer assembly. The annular member and the shim package combine to define a cumulative distance between opposite lateral ends thereof. The cumulative distance defined by the shim package and the annular member is initially greater than the measurable distance the annular member fixed from the side surface of the gear. A salient feature of the present invention is that the shimming kit of the present invention can be custom fit or specifically sized to the respective synchronizer assemblies by removing shims from the shim package and from about the shaft to achieve the predetermined operating clearance for the synchronizer assembly without requiting disassembly of the gear meshes and the synchronizer assembly from about the transmission shaft.

The individual shims of the shim package are preferably configured with a tearing line of weakness extending radially outward to the outer diameter of each shim. In the most preferred form of the invention, the shims are stacked in a predetermined order between the annular member and the gear and range in thickness between about 0.004" to about 0.032". To enhance wearability of the shimming kit during operation of the transmission shaft, a thrust washer which slides along and rotates with the shaft is disposed between the shim package and the side surface of the gear. In an alternative embodiment of the invention, any elongated sleeve, which slidably fits over and along the shaft, is fitted between the shims and the side surface of the gear.

The shimming kit of the present invention is advantageous in several respects. The shimming kit of the present invention permits standard or conventional synchronizer assemblies to be used rather than requiting special made versions of synchronizer assemblies. The shimming kit of the present invention eliminates the laborious task of having to assemble and disassemble the transmission to accomplish a proper and accurate operating clearance for the synchronizer assembly. Unlike heretofore known procedures, the ability to remove shims from the kit yields a high degree of accuracy and control over the operating clearances associated with the shimming assembly.

Providing a high degree of accuracy over the operating clearances associated with the synchronizer assemblies naturally enhances the operating performance of the synchronizer assemblies as well as providing proper lubrication qualities for the components parts thereof. In those transmissions where the shaft assembly endwise moves a relatively large amount, the shimming kit of the present invention eliminates the need to add additional material to the gear faces to assure proper operation of the synchronizer assembly. Because the shimming kit of the present invention can be customized to take-up tolerances of any particular synchronizer assembly, many of the heretofore demanding high tolerance dimensions required with certain synchronizer assembly parts can be substantially reduced. Furthermore, the kit of the present invention eliminates the need for the snap-rings at each end of the synchronizer assembly. Eliminating one of the snap-rings, of course, likewise eliminates the need for an additional annular snap-ring groove and thus reduces the manufacturing processes thereby yielding an economical and cost-effective solution to a well known and existing problem.

Numerous other features and advantages of the present invention will become readily apparent from the following detailed description, the accompanying drawings and the appended claims.

DETAILED DESCRIPTION OF THE PRESENT INVENTION

While the present invention susceptible of embodiment in various forms, there are shown in the drawings and where hereinafter be described to preferred embodiments of the invention with the understanding that the present disclosure is to be considered as setting forth two exemplifications of the invention which are not intended to limit the invention to the specific embodiments illustrated.

Figure 1:
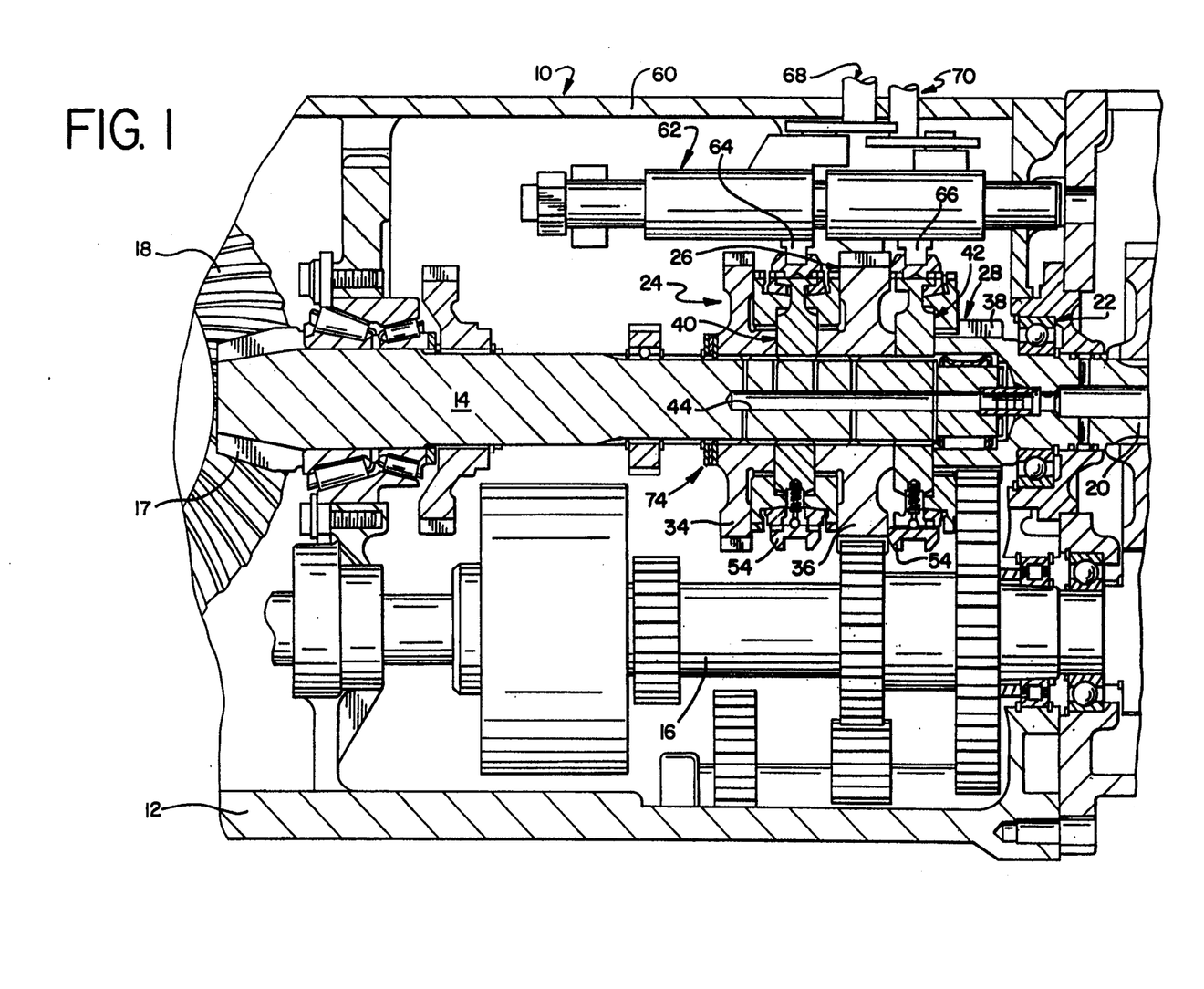
FIG. 1 is a fragmentary longitudinal sectional view of a transmission embodying features of the present invention.

Referring now to the drawings, wherein like reference numerals indicate like parts throughout the several views, there is schematically illustrated in FIG. 1 a transmission 10. Transmission 10 includes an open top housing 12 which journals a rotatable shaft 14 and countershaft 16. In the illustrated embodiment, one end of shaft 14 is provided with a gear 17 which engages with a pinion gear 18 likewise rotatably supported by housing 12. As shown, shaft 14 is endwise positionable within the housing 12 in a conventional manner to set a proper backlash between gears 17 and 18. In the illustrated embodiment, another shaft 20 is arranged in axial alignment with and is journalled upon shaft 14 at an end opposite to gear 17. Shaft 20 is rotatably supported and endwise positioned within the housing 12 by a bearing assembly 22.

As shown in FIG. 1, transmission 10 includes first, second and third gear meshes 24, 26 and 28, respectively, for establishing different power paths through the transmission. It will appreciated, however, that transmission 10 may include more or less gear meshes than that illustrated. The gear meshes which are illustrated are provided for exemplary purposes only and are not to be construed as limitations as to the invention disclosed herein. Gear mesh 24 includes a gear 34 mounted on shaft 14. Gear mesh 26 includes a gear 36 likewise mounted on shaft 14. Gear mesh 28 includes a gear 38 provided on shaft 20.

Gear meshes 24 and 26 have a synchronizer assembly 40 arranged in operable combination with the gears 34 and 36 for controlling the transference of power between shaft 14 and the first and second gear meshes 24 and 26. Another synchronizer assembly 42 is arranged in operable combination with gear 38 to control the transfer of power between shaft 14 and gear mesh 28. In the illustrated embodiment, shaft 14 is provided with suitable lubricant passageways 44 for delivering lubricant to the component parts of the synchronizer assemblies 40 and 42 during operation of the transmission.

Figure 2:
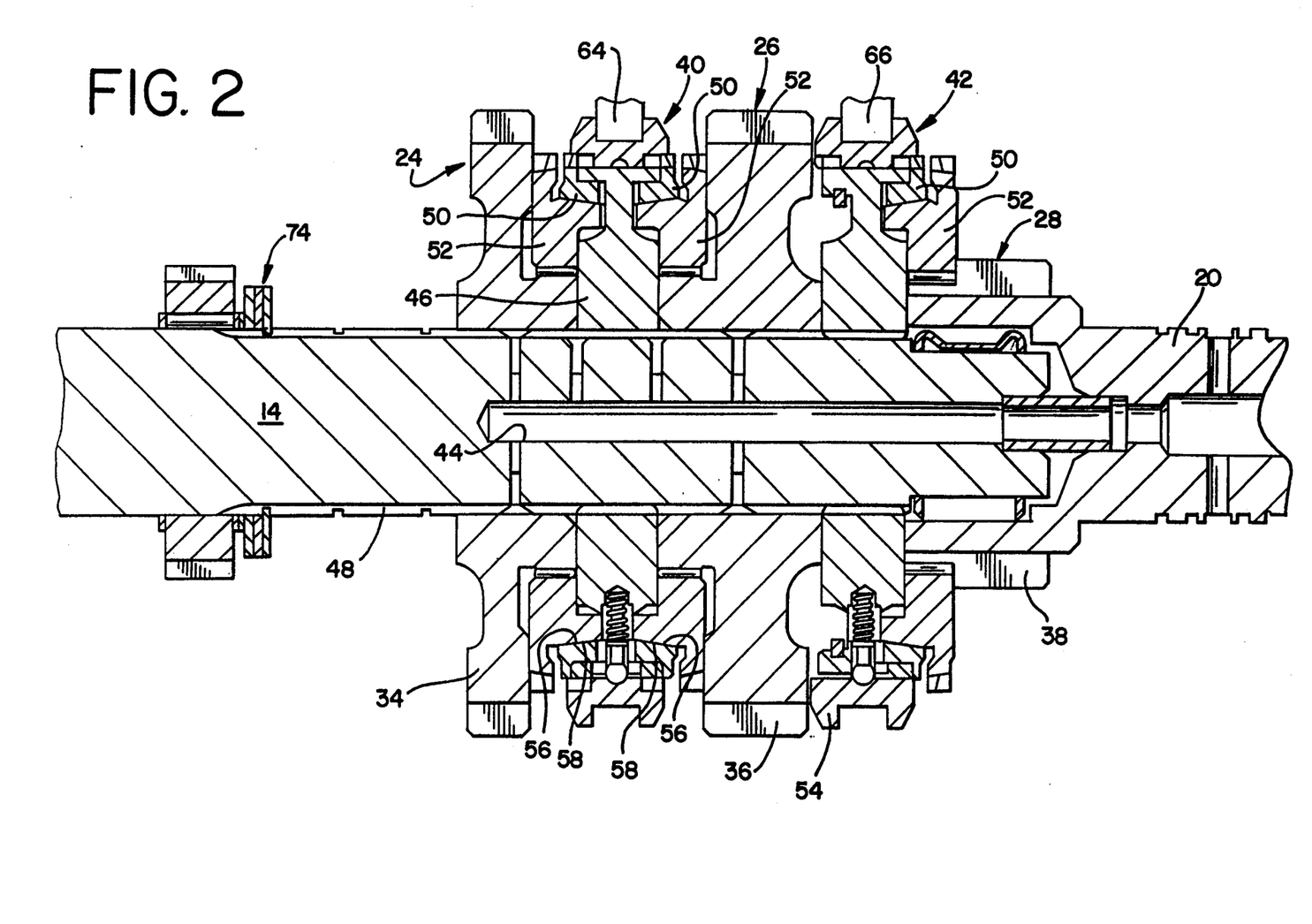
FIG. 2 is an enlarged fragmentary view of a typical transmission shaft having synchronizer assemblies arranged thereabout.

Turning now to FIG. 2, with the exception of the number of gear meshes arranged in operable combination therewith, the synchronizer assemblies 40 and 42 are substantially identical. As shown, each synchronizer assembly is of conventional construction and includes a synchronizer hub 46 having a predetermined lateral width and which engages with a spline configuration 48 profiled along at least the portion of the outer diameter of shaft 14. Synchronizer assembly 40 includes a pair of synchronizer tings 50 fit between the synchronizer hub 46 and a respective pair of clutch rings 52 which engage with a particular gear of the gear mesh being operated. As shown, synchronizer assembly 42 has a single clutch ting 52 operably arranged in combination with gear 38 of gear mesh 28. Each synchronizer assembly 40, 42 further includes a sliding sleeve 54. As is conventional, sleeve 54 acts to couple the synchronizer hub 46 of the respective synchronizer assembly to the synchronizer ring 50 and ultimately to the clutch ring 52 as through a well known dog clutch arrangement thereby controlling the operativeness of each gear mesh.

The rings 50 and 52 of each synchronizer assembly 40, 42 are provided with generally corresponding frusto-conical inter-engaging annular surfaces 56 and 58 defined thereon. As is well known, engagement between the surfaces 56 and 58 tends to synchronizer the speeds of the rings to facilitate sliding movement of the sleeve 54 resulting in engagement of the dog clutch thereby effecting a smooth engagement of the gear mesh. As is conventional, a predetermined tolerance is required between the surfaces 56 and 58 on the rings 50 and 52, respectively, so as to allow the synchronizer to operate in a neutral band or mode.. These tolerances will vary depending upon the frictional materials used to fabricate the synchronizer.

Returning to FIG. 1, the open housing 12 of the transmission 10 is closed by a removable cover 60. A shift rail assembly 62 is mounted for endwise sliding movement within the transmission housing 12 and includes a series of laterally spaced shifting collars 64 and 66. As is well known, the shifting collars 64, 66 of the shift rail assembly 62 engages with sleeves 54 of the synchronizer assemblies 40, 42, respectively. Conventional operator controlled shift linkages 68 regulate endwise movement of the shift collars 64 and 66 and thereby regulate operation of the various gear meshes to effect the transfer of power through the transmission.

What has been described heretofore is substantially conventional structure which is well known in the art. The present invention concerns a synchronizer shimming kit 74 which allows predetermined operating clearances to be provided for the synchronizer assemblies 40 and 42 without requiring disassembly of the gear meshes 24, 26 and 28 and the synchronizer assemblies 40, 42 from about the transmission shaft 14.

Figure 3:
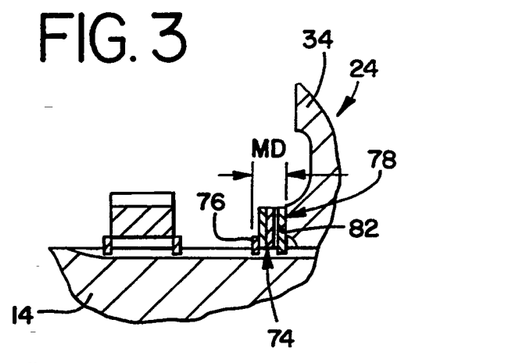
FIG. 3 is an enlarged fragmentary view schematically illustrating the synchronizer shimming kit of the present prevention arranged in an operable position.
Figure 4:
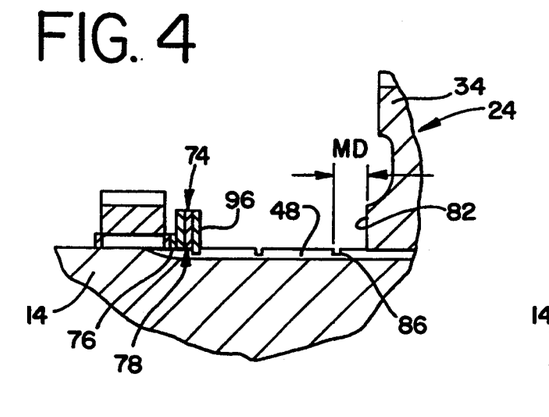
FIG. 4 is a view substantially similar to FIG. 3 showing the synchronizer shimming kit of the present invention in an non-operable position.

As seen in FIGS. 3 and 4, the synchronizer shimming kit 74 of the present invention is moveable along the shaft 14. In one position (FIG. 3), the shimming kit 74 is positioned to set predetermined operating clearances for the synchronizer assemblies 40 and 42 by absorbing or taking-up the tolerance stackup associated therewith. In a second position (FIG. 4), the component parts of the shimming kit 74 are loosely arranged relative to each other along the shaft 14.

The shimming kit 74 of the present invention is positioned to one side of the synchronizer assemblies 40, 42 (FIG. 2) and includes an annular member 76 adapted to be releasably fixed to the shaft 14 and a shim package 78 comprised of a plurality of shims 80.

When the shimming kit 74 is positioned (FIG. 3) to set a predetermined operating clearance for the synchronizer assemblies. 40, 42 (FIG. 2), the annular member 76 is affixed to the shaft 14 a measurable distance "MD" from a side surface 82 of the laterally adjacent gear 34. In the illustrated embodiment, the annular member 76 of kit 74 comprises a snap-ring 84 which releasably engages with an annular groove 86 defined by shaft 14. As seen in FIG. 4, the distance which separates the groove 86 from the side surface 82 of gear 34, which in the illustrated embodiment is equal to the measurable distance "MD", is readily measurable through any suitable means through the opening in the housing 12 (FIG. 1).

Figure 5:
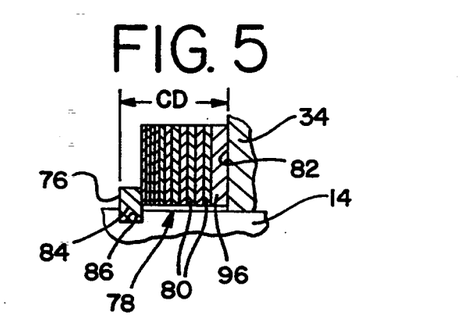
FIG. 5 is an enlarged fragmentary view of the synchronizer shimming kit of the present invention.

Turning to FIG. 5, the shim package 78 comprises a plurality of individual angularly shaped shims 80 adapted to be positioned between the annular member 76 and the side surface 82 of the gear 34. Notably, the shim package 78 and the annular member 76 combine to define a cumulative distance "CD" between opposite lateral ends. When the shimming kit 74 is initially placed about the shaft 14, the cumulative distance "CD" is greater than the measurable distance "MD" described above. The shims 80 comprising the package 78 are individually sized in varying thicknesses relative to each other. The individualized shims 80 comprising package 78 range in thickness from about 0.004" to about 0.032". Moreover, the shims 80 are arranged in a predetermined order of thickness relative to each other between opposite ends of the package 78.

Figure 6:
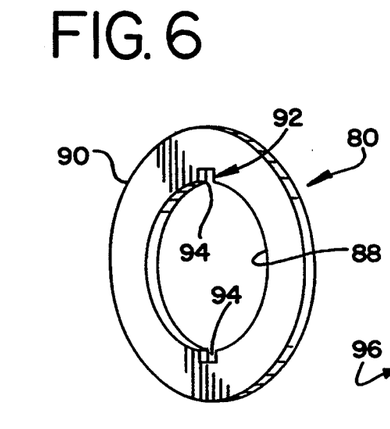
FIG. 6 is a perspective view of a shim comprising part of the synchronizer shimming kit.

As seen in FIG. 6, each shim 80 is provided with a central aperture 88 which is sized to allow the shim to pass along and about the outside diameter of shaft 14. Each shim further includes an annular periphery 90. Moreover, each shim 80 is provided with a tearing line of weakness 92 extending radially outwardly from the central aperture 88 toward the periphery 90 of the shim. In the illustrated embodiment, this tearing line of weakness 92 is defined by a pair of diametrically opposed slits or grooves 94 which facilitate cutting and/or tearing of the shim from about the shaft: 14 (FIG. 3) in response to suitable forces being applied thereto as with a suitable tool (not shown)

Figure 7:
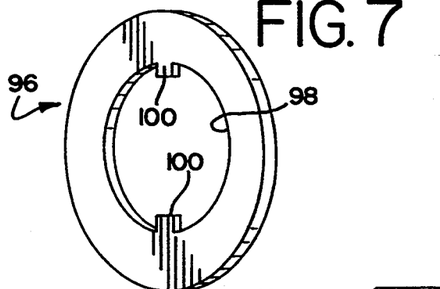
FIG. 7 is a perspective view of another component part of the shimming kit of the FIG. 8 is an alternative embodiment of the present invention.

As shown in FIG. 5, the shimming kit 74 may further include a thrust washer 96 provided between the shim package 78 and the side surface 82 of the respective gear of the gear mesh to enhance the wearability characteristics of the shimming kit 74 during operation of the shaft 14. As seen in FIG. 7, the thrust washer 96 is preferably provided with an annular design including a generally centralized aperture 98 allowing the washer 96 to slide along the shaft 14 (FIG. 5). A pair of diametrically opposed inner teeth or projections 100 are provided for engagement with the spline configuration 48 (FIG. 4) extending along the outer periphery of the shaft 14 to effect conjoint rotation of the washer 96 and the shaft 14.

Figure 8:
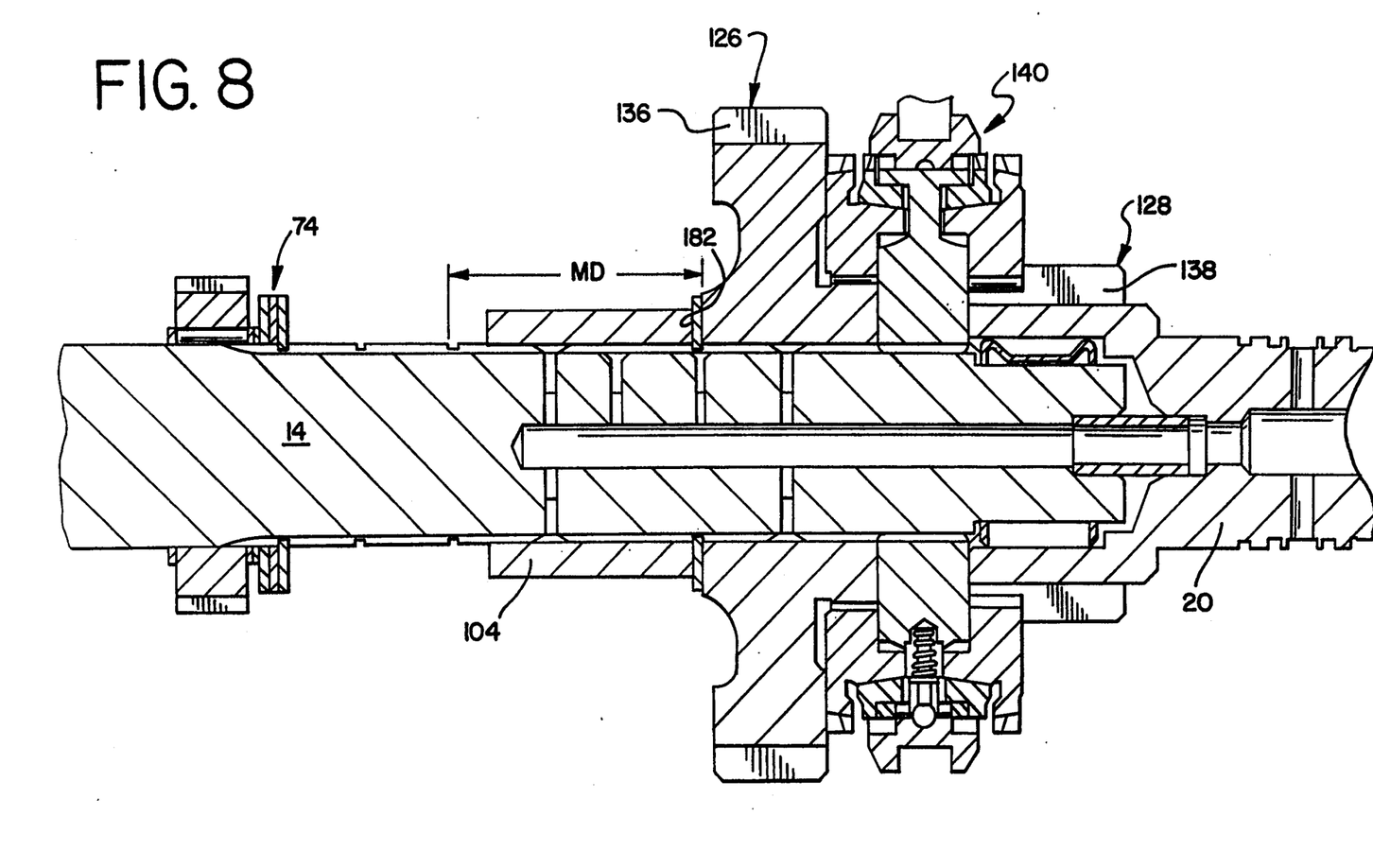
Figure 9:
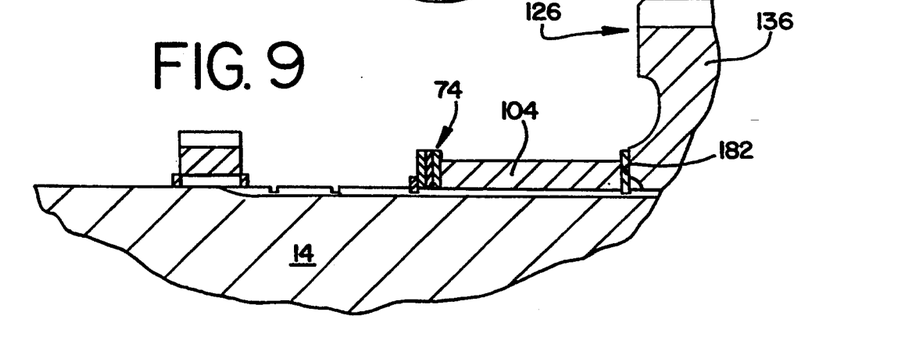
FIG. 9 is s an enlarged fragmentary view of an alternative form of the present invention.

FIGS. 8 and 9 schematically illustrate an alternative embodiment of the present invention. In the embodiment illustrated in FIG. 8, dual gear meshes 126 and 128 are illustrated including gears 136 and 138, respectively.

In this illustration, gear 136 is mounted on shaft 14 while gear 138 is mounted on shaft 20 of the transmission. The gear meshes 126 and 128 are substantially identical to gear meshes 26 and 28 discussed above and, thus, no further explanation need be provided for a proper understanding thereof. A conventional synchronizer assembly 140 is provided between the gears 136 and 138 of the gear meshes 126 and 128, respectively. The synchronizer assembly 140 is substantially similar in construction to synchronizer assembly 40 discussed above and, thus no further detail need be provided for a proper understanding thereof.

As illustrated in FIGS. 8 and 9, a shimming kit 74 according to the present invention is provided on the shaft 14 to one side of the gear mesh 126. Because only two gear meshes are provided on the shaft 14, however, the measurable distance "MD" separating the side surface 182 of gear 136 from the position whereat the annular member 76 of the shimming kit 74 is to affixed to the shaft 14 is substantially greater than the measurable distance associated with the earlier embodiment discussed above wherein more than two gear meshes are arranged on the shaft 14. In this embodiment of the shimming kit 74, an elongated sleeve 104 is added to the shimming kit. The elongated sleeve 104 slidably fits over and along the shaft 14 between the shim package 78 and the side surface 184 of the gear 136. In effect, the sleeve 104 axially extends the side surface 184 of gear 136 without adding substantial or significant weight or cost to the transmission. Moreover, the same shimming kit 74, as discussed above, can be used in combination with sleeve 104 for setting the proper operating clearances for the synchronizer assembly 140.

Setting a proper operating clearance for each synchronizer assembly 40, 42 arranged on the shaft 14 of the transmission 10 can be and typically is complicated by several different and closely related factors. First, manufacturing tolerances associated with the component parts needs to be considered. As will be appreciated by those skilled in the art, manufacturing tolerances are associated with the dimension between opposite lateral sides of the synchronizer hub 46 of each synchronizer assembly. There are manufacturing tolerances associated with the dimension between opposite lateral sides of each gear 36 and 38 associated with the synchronizer assemblies 40 and 42, respectively. Moreover, an extremely tight manufacturing tolerance is required between the interfacing surfaces 56 and 58 of the synchronizer and clutch rings 50 and 52, respectively, of each synchronizer assembly. As will be appreciated, different frictional materials used to fabricate the rings of the synchronizer assembly require different tolerances for proper operation therefor, adding to the complexity of providing accurate and proper operating clearances for the synchronizer assemblies. The need to laterally adjust the endwise position of the shaft 14 to accomplish a proper backlash setting between the gears 17 and 18 furthermore complicates achieving a proper operating clearance for the synchronizer assemblies. Manufacturing tolerances associated with bearing assembly 22 used to endwise position shaft 20 relative to shaft 14 still furthermore complicates setting a proper operating clearance for each synchronizer assembly 40, 42.

The synchronizer shimming kit 74 of the present invention readily and easily permits a proper operating clearance to be set for each of the synchronizer assemblies 40, 42 without requiring tedious and laborious assembly processes heretofore known for setting proper operating clearances for the synchronizer assemblies. With the present invention, and with the embodiment of the invention illustrated in FIGS. 1 and 2, the annular member 76 and shim package 78 are slidably arranged along and about the shaft 14. Thereafter, gear 34 forming part of the gear mesh 24 and the synchronizer assembly 40 are assembled on the shaft 14. The other gear 36 forming part of the gear mesh 26 and synchronizer assembly 42 and the rest of the transmission components may thereafter be arranged along and in combination with the shaft 14.

After the component parts have been assembled on shaft 14, the measurable distance "MD" laterally separating the side surface 82 of gear 34 from the annular groove 88 is measured. As will be appreciated, the measurable distance "MD" separating the side surface 82 of gear 34 from the annular groove 88 represents an exacting or optimum operating clearance for each of the synchronizer assemblies 40, 42 and the gear meshes 24, 26 and 28 arranged in combination therewith. Each shim package 78 of the shimming kit 74 has a predetermined distance or thickness between opposite ends thereof. The thickness of the shim package 78 is added to the lateral distance between opposite side faces of the annular member 76 which in the preferred embodiment includes snap-ring 84, to define the cumulative distance "CD" for the shimming kit 74. Of course, when thrust washer 96 is used in combination with the shimming kit 74, the lateral distance between opposite side surfaces of the thrust washer 96 is likewise added to thicknesses of the s[dm package 78 and the annular member 76 to compute the cumulative distance "CD" of the shimming kit 74. Alternatively, the sleeve 104 can be used in appropriate situations to add significant cumulative distance to the shimming kit 74. In the most preferred from of the invention, the initial cumulative distance "CD" of the shimming kit 74 as assembled on the shaft 14 is greater than the measurable distance "MD".

The measurable distance "MD" is thereafter subtracted from the initial cumulative distance "CD" of the shimming kit 74. Preselected shims 80 are thereafter removed from the shimming kit 74 and from about the shaft 14 until the cumulative distance "CD" of the shimming kit 74 closely proximates the measurable distance "MD" thereby establishing a proper working or operating clearance for the synchronizer assemblies 40, 42 and the gear meshes 24, 26, and 28 arranged in combination therewith. As will be appreciated, varying the specific thicknesses of the shims between about 0.004 inches and about 0.032 inches allows an exacting operating clearance to be provided for the synchronizer assemblies and gear mesh combinations. Placing the shims 80 in a predetermined order within the shim package facilitates appropriate sizing of the shim package 78 to meet the particular measurable distance required for setting appropriate clearances for the synchronizer assemblies. Moreover, providing a tearing line of weakness on each of the shims 80 facilitates there removal from the shim package 78 as by tearing and/or cutting thereby allowing the shim kit 74 to be readily adaptable to various measurable distance computations.

After the shimming kit 74 has been appropriately sized, the shimming kit is slid into position adjacent the side surface 82 of gear 34. The shimming kit 74 is slid along the shaft 14 until the annular member 76 is appropriately positioned on the shaft 14. In the illustrated embodiment, the shimming kit 74 is slid along the shaft 14 until the snap-ting 84 releasably engages with the annular groove 88. A notable advantage of the present invention is that the shimming kit 74 provides a high degree of control over providing predetermined operating clearances for the synchronizer assemblies and the gear meshes without requiring laborious and time consuming disassembly of the transmission and the component parts to achieve the desired result. Because the present invention provides a high degree of control over the clearances of the synchronizer assemblies, many of the heretofore high toleranced dimensional areas associated with the synchronizer assemblies 40, 42 can be subjected to less restrictive manufacturing tolerances. Also, providing a high degree of control over the operating clearances promotes proper lubrication of the component parts thus enhancing effective and efficient operation of the synchronizer assemblies and related components.

In those transmission embodiments wherein the shaft is required to endwise move to effect a proper relationship with an adjacent member, the ability to adjust or modify the shimming kit 74 of the present invention without requiting disassembly of the component parts also eliminates the need to add different lateral gear configurations to assure proper operating clearances for the synchronizer assemblies. The versatility of the shimming kit 74 is further enhanced through the use of the elongated sleeve 96 in combination with the shim package 78.

The shimming kit of the present invention furthermore eliminates unnecessary parts and, thus, manufacturing expenses for the transmission. As described in detail above, the shimming kit 74 utilizes a single annular member 76 which is releasably fixed to the shaft 14. In contrast, prior art arrangements typically required two snap-rings arranged on opposite sides of the synchronizer assemblies. Thus, the present invention has eliminated at least one snap-ting as well as the manufacturing processes involved with accurately locating an additional snap-ring groove in the shaft 14. Moreover, the Is,resent invention provides the shimming kit 74 wherein shims 80 are cut or otherwise removed from the shim package 78 so as to absorb or take-up the large tolerances inherent with the synchronizer assemblies for proper operation and without requiring laborious disassembly of the synchronizer assemblies and the gear meshes associated therewith.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. A synchronizer shimming kit adapted for assembly and mounting about a rotatable transmission shaft journalled in a transmission housing to one side of first and second laterally aligned synchronizer assemblies, said synchronizer assemblies being arranged in operable association with first and second .gear meshes, with each synchronizer assembly requiring a predetermined operating clearances relative to a gear of the respective gear mesh with which the synchronizer assembly is operably associated, said synchronizer shimming kit comprising:.

an annular snap-ring adapted to releasably engage an annular groove provided on said transmission shaft a measurable lateral distance from a side surface provided on one of said gears; and a predetermined series of annular shims adapted to be positioned about said shaft between said snap-ring and said one of said gears, said shims and snap-ting combining to define a cumulative distance between Opposite lateral ends thereof which is greater than said measurable distance, and whereby each shim is removable from about said shaft to achieve the predetermined operating clearance between each of the synchronizer assemblies and their respective gears without requiting disassembly of the gear meshes and the synchronizer assemblies from about the transmission shaft.

2. The synchronizer shimming kit according to claim 1 wherein a thrust washer is disposed between said series of annular shims and the side surface of said gear to enhance wearability of the kit during operation of the transmission shaft.

3. The synchronizer shimming kit according to claim 1 wherein each of said shims is provided with a central aperture having a tearing line of weakness extending radially outward therefrom toward the outside diameter of the shim.

4. The synchronizer shimming kit according to claim 1 wherein said shims range in thickness between about 0.004 inches to about 0.032 inches.

5. A synchronizer shimming kit adapted for assembly and mounting about a transmission shaft having a synchronizer assembly mounted in operable combination with a gear arranged on said shaft, said synchronizer shimming kit comprising:

an annular member adapted to be releasably fixed to said shaft a measurable lateral distance from a side surface provided on said gear; and a package of individual angularly shaped shims adapted to be positioned between said annular member and said side surface of ,said gear, said shim package and said annular member having a cumulative distance between opposed lateral ends thereof which distance is greater than the measurable distance separating said ;side surface on said gear from said annular member, and wherein individual shims are removable from said package and about said shaft so as to provide a predetermined operating clearance between said synchronizer assembly and said gear without requiting disassembly of the synchronizer assembly and gear from about the transmission shaft thereby facilitating assembly of the transmission shaft.

6. The synchronizer shimming kit according to claim 5 wherein said annular member comprises a snap-ring which releasably engages with an annular groove defined on said shaft a predetermined lateral distance from the side surface of said gear.

7. The synchronizer shimming kit according to claim 5 further including a thrust washer arranged between said shim package and the side surface of said gear to enhance wearability characteristics of the kit during operation of the transmission shaft.

8. The synchronizer shimming kit according to claim 7 wherein said transmission shaft is provided with a splined outer profile, and said thrust washer is configured to non-rotatably engage the outer splined profile of the transmission shaft to rotate therewith.

9. The synchronizer shimming kit according to claim 5 wherein the shims in said package are individually sized in varying thicknesses relative to each other to facilitate accomplishing the predetermined operating clearance for the synchronizer assembly.

10. The synchronizer shimming kit according to claim 9 wherein the individual shims are arranged in a predetermined order of thickness relative to each other between opposite ends of said package.

11. The synchronizer shimming kit according to claim 5 wherein each of said shims is provided with a tearing line of weakness to facilitate removal of the shims from about the transmission shaft.

12. The synchronizer shimming kit according to claim 5 further including an elongated sleeve which slidably fits over and along said shaft between said shim package and the side surface of said gear.

* * * * *